United States Patent [19]
Wight, Jr.

[11] 3,752,462
[45] Aug. 14, 1973

[54] ELASTOMERIC SPRING AND FRICTIONAL DAMPING SHOCK ABSORBER

[75] Inventor: George W. Wight, Jr., Huron, Ohio

[73] Assignee: Clevite Corporation, Chicago, Ill.

[22] Filed: May 14, 1971

[21] Appl. No.: 143,544

[52] U.S. Cl. .................................... 267/140, 293/88
[51] Int. Cl. ............................................. F16f 7/00
[58] Field of Search ...................... 267/140; 293/88

[56] References Cited
UNITED STATES PATENTS
3,056,620   10/1962   Adams ................................. 293/88
3,380,557   4/1968    Peterson ............................. 267/140
3,398,812   8/1968    Peterson ............................. 267/140
3,610,609   10/1971   Sobel .................................. 267/140

Primary Examiner—James B. Marbert
Assistant Examiner—John Mannix
Attorney—Edward E. Sachs

[57] ABSTRACT

An elastomeric shock absorber for interposition between an automotive chassis and bumper. The device includes an elastomeric tube arranged partly peripherally constrained and partly unconstrained in a tubular casing. A piston in the casing axially loads the elastomeric tube.

12 Claims, 11 Drawing Figures

PATENTED AUG 14 1973 3,752,462

INVENTOR
GEORGE W. WIGHT, JR.
BY *Edward E. Sachs*
ATTORNEY

INVENTOR.
GEORGE W. WIGHT, JR.
BY Edward E. Sachs
ATTORNEY

INVENTOR.
GEORGE W. WIGHT, JR.
BY Edward E. Sachs
ATTORNEY

ELASTOMERIC SPRING AND FRICTIONAL DAMPING SHOCK ABSORBER

This invention relates generally to a shock absorber and, more particularly, to a shock absorber of the type in which an elastomeric member is in frictional engagement with a rigid casing and is adapted to be deformed to establish spring and shock absorbing characteristics.

The invention is adapted to be employed as a shock absorber between the bumper and the chassis of an automobile.

The device to which this invention pertains involves the employment of an elastomer mechanically confined in a limited area and adapted to generate a reaction force which is greater than that of an identically deformed part held without any restraint or confinement. It has been found that complete confinement of a loaded elastomer, and actuation thereof, does not establish the type of reactive forces desired for automotive bumper shock absorbing applications.

For purposes of elucidation it should be noted that for an automotive shock absorbing bumper, it is desirable to buffer the maximum possible amount of kinetic energy within predetermined restraints of allowable force and deflection. This situation is achieved by providing a mechanism which will display a constant reaction force at the predetermined level, over the desired stroke. This condition is recognized as a step function or square wave response.

The employment of a completely confined elastomer fails to fulfill the requirement of a square wave form because the non-compressible elastomer acts to produce a "hydraulic lock" situation. The force reaction to a small increment of displacement will be uncontrollable in magnitude — theoretically infinite.

On the other hand, an elastomeric cylinder which is completely unconfined on the diameter but axially loaded, also fails to provide the square wave form response, — instead such a device exhibits a force vs. deflection curve whose slope is ever-increasing throughout the stroke. This condition is similar to the characteristic "ever-increasing rate curve" of an elastomer in compression.

A partially confined device in accordance with the invention produces the desired square wave response by providing an elastomeric cylinder, a large percent of whose length is confined during the initial portion of the stroke, but which is substantially unconfined relative to the restricting diameter of the casing at the end of the stroke.

To summarize, the present device utilizes the confinement to achieve a high rate during initial deflection to achieve the desired force level rapidly. The load is maintained at a constant level during the stroke because the decreasing percent of confinement is balanced the increasing theincreasing material deformation (buckling) in the unconstrained or enlarged region. The level of the constant reaction force is affected by the frictional characteristics between the tube and the elastomer.

The buckled elastomer pushes itself back into the confining region when the load is removed to effect a return of the bumper to its original position.

The partially constrained elastomeric shock absorber establishes a force pattern in which the energy is absorbed in a most efficient manner. This absorption of energy is also facilitated by the frictional engagement of the elastomeric member with the outer metal casing or tube. The exact ratio of constrained and unconstrained area depends upon the predetermined force which is to be applied, the length of the stroke, the material of the various components and a variety of other considerations. To date, research has indicated that for automotive bumper applications, a device having an elastomeric member which is axially constrained to about 40 to 80 percent provides the most efficient spring, damping, and shock absorbing characteristics.

It is therefore the primary object of the present invention to provide an elastomeric spring and frictional damping shock absorber which is particularly adapted to be employed in the automotive field and, more particularly, which can be effectively interposed between the bumper and the chassis of an automotive vehicle.

It is a further object of the present invention to provide a device of the type described above which is capable of absorbing the energy at a rate most suitable for such automotive applications and is capable of responding, to some degree, to shocks from various angles of attack.

It is a further object of the present invention to provide a combination elastomeric spring and dampening shock absorber interposable between a chassis and a bumper, in which the elastomeric member upon release of the applied load, causes the bumper to be returned to its original position.

An aspect of the present invention resides in the provision of an elastomeric spring and frictional damping shock absorber which has a rigid casing of generally tubular configuration with one enlarged region of comparatively greater diameter than the forward region of the casing and which includes, at each axial end, a restricted end. Extending through one of the restricted ends is a piston rod connected to a piston head disposed in the forward region of the casing. Between the piston head and the restricted end or cover at the far end, there is arranged a cylinder-like elastomeric member having a substantially uniform outer diameter in the forward region which dimensionally equals or exceeds the inside diameter of the casing in the forward region to place the elastomeric member under radial constraint to establish friction.

The enlarged region of the casing has an inside diameter which is effective, upon the application of an external load, to permit limited radial deflection of elastomeric member.

For a better understanding of the present invention, together with other and further objects thereof, reference is had to the following description taken in connection with the accompanying drawings, and its scope will be pointed out in the appended claims.

Figure 1:
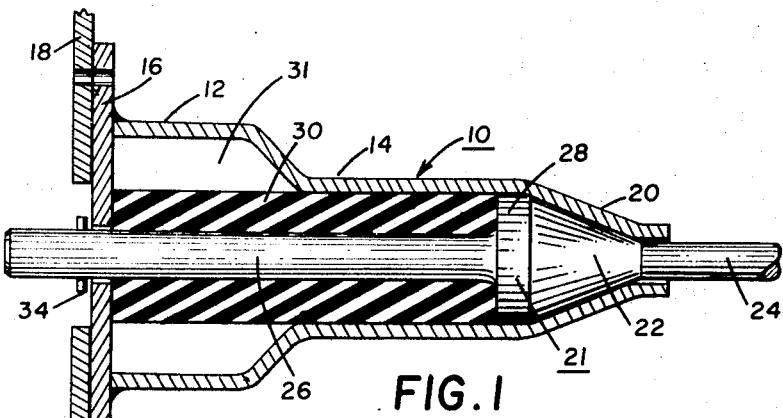
FIG. 1 is an axial cross section of a device in accordance with the invention and FIGS. 1a, 1b and 1c show several stages of the operating sequence of the device.

Referring now to FIG. 1 and FIGS. 1a to 1c, there is shown an elastomeric spring and frictional damping shock absorber having a rigid casing 10 of generally tubular configuration with an enlarged region 12 of comparatively greater diameter than forward region 14 to provide constraint in region 14 and limited deflection in region 12 as hereinafter further described. The enlarged region 12 and, more particularly, the terminal axial end thereof, is restricted by an end cover 16, which is connectable to a chassis or bumper of an automotive vehicle (not shown) by means of a connecting plate 18. The extreme forward end of the casing, see 20, is in the shape of a hollow truncated cone to receive therein a piston 21 having a piston head 22 of complementary geometrical configuration. The piston head 22 is integrally formed with an outwardly projecting piston rod 24 connectable to a suitable structure of the automotive vehicle, whereas the opposite end of the head 22 is formed with a piston rod 26 extending concentrically through the tubular casing 10 and protruding through the end cover 16 in a manner to permit relative motion therebetween without establishing excessive friction. The piston 21 is axially movable within the casing 10 and for this purpose the enlarged portion 28 of the cone-like piston head 22 has an outside diameter which satisfies the requirement for a sliding fit between the head portion 28 and the adjacent inside surface of the casing 10. Due to the configuration of the truncated-cone piston head 22, and the truncated end 20 of casing 10 a metal-to-metal contact is established therebetween to provide during the absence of outside load conditions some rigidity, and an ability of absorb slight conical impact. Mounted about the inside portion of piston rod 26 and disposed between the axial inside face of the piston head 22 and the cover 16, there is concentrically arranged, within the casing, a cylinder-like elastomeric member 30, which, in the preferred embodiment, is a tube of uniform inside and outside diameter. In the forward region 14 of the casing, the outside diameter of the elastomeric member 30 nearly matches, or exceeds, depending upon the desired response, the inside diameter of the casing to place the elastomeric member under a radial constraint upon initiation of axial movement in order to establish some resistance to the axial motion.

Figure 1A:
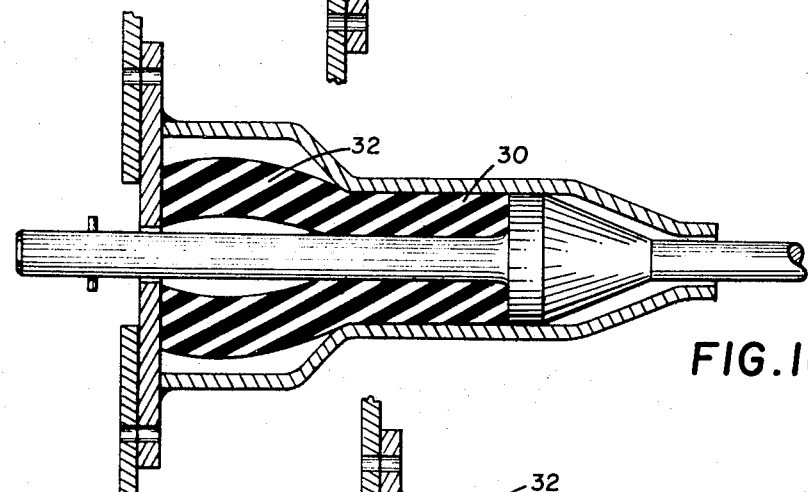
Figure 1B:
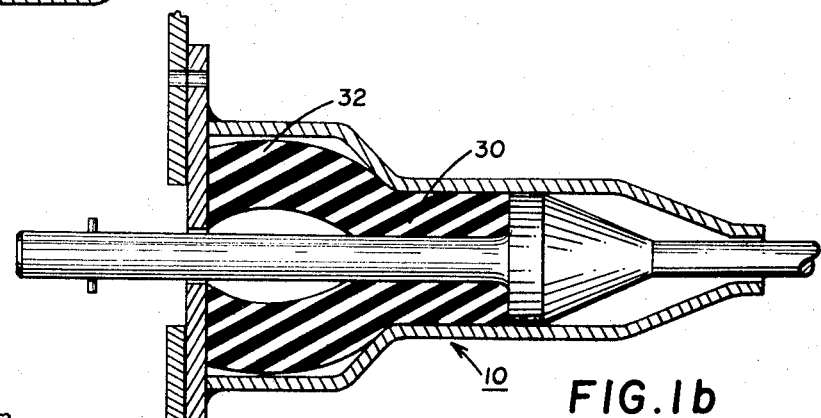
Figure 1C:
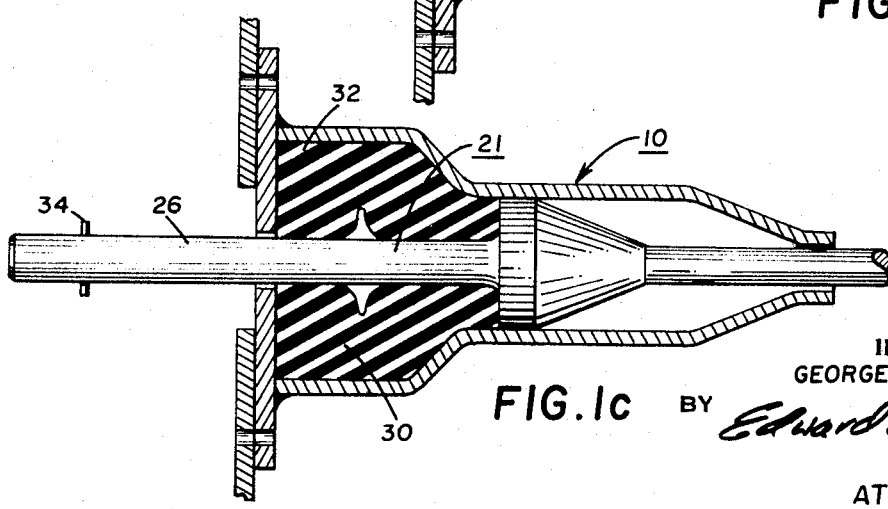

In the embodiment shown in FIG. 1, the outside diameter of the elastomeric member 30 in the enlarged region 12 is under no radial constraint so that a clearance 31 is established between the elastomeric member 30 and the enlarged portion 12 of the casing 10. The application of an axial load upon the elastomeric member 30, by virtue of actuation of piston 21, causes the elastomeric member and, more particularly, the portion 32 in the enlarged region 12, to be deflected, to a limited extent, and ultimately to buckle, as shown in FIGS. 1a, 1b and 1c until the enlarged region 12 is substantially filled with displaced elastomeric material. The member 30 may be composed of natural rubber, butyl, or other elastomeric materials of the polymer group provided suitable properties are imparted to satisfy the herein described operating requirements.

It is obvious to those skilled in the art that the relative movement between the piston head 22 and the casing 10 is established by virtue of impact upon the bumper (not shown), causing relative motion between the bumper and the chassis, which the device in accordance with the invention is adapted to absorb.

The device shown in FIG. 1 thus discloses a casing 10 in which one portion of the tubular elastomeric member 30 is under radial restraint and another portion which is not under such restraint. When a force applied through the piston rod 24 upon the piston head 22 causes the head to move axially, a slight deflection of the elastomeric member in the enlarged region 12 occurs as shown in FIG. 1a, and the outside as well as the inside diameter of the elastomeric member 30 starts to swell in the forward region 14, thereby increasing resistance to axial movement due to the contact with the rod 26 and the inner surface of the casing portion 14, both of which are composed of a metallic material.

The piston rod 26 may be provided with a stopper 34 rigidly secured to the rod 26 and effective to abut the cover 16 in order to absorb (optionally) some, most, or all of the axial force generated when the axial load upon the elastomeric member 30 is released and the piston head 22 returns to its initial position, as shown in FIG. 1. Such stopper 34 obviates the need to construct the casing portion 20 to withstand and stop the axial backstroke of the piston head 22.

Figure 8:
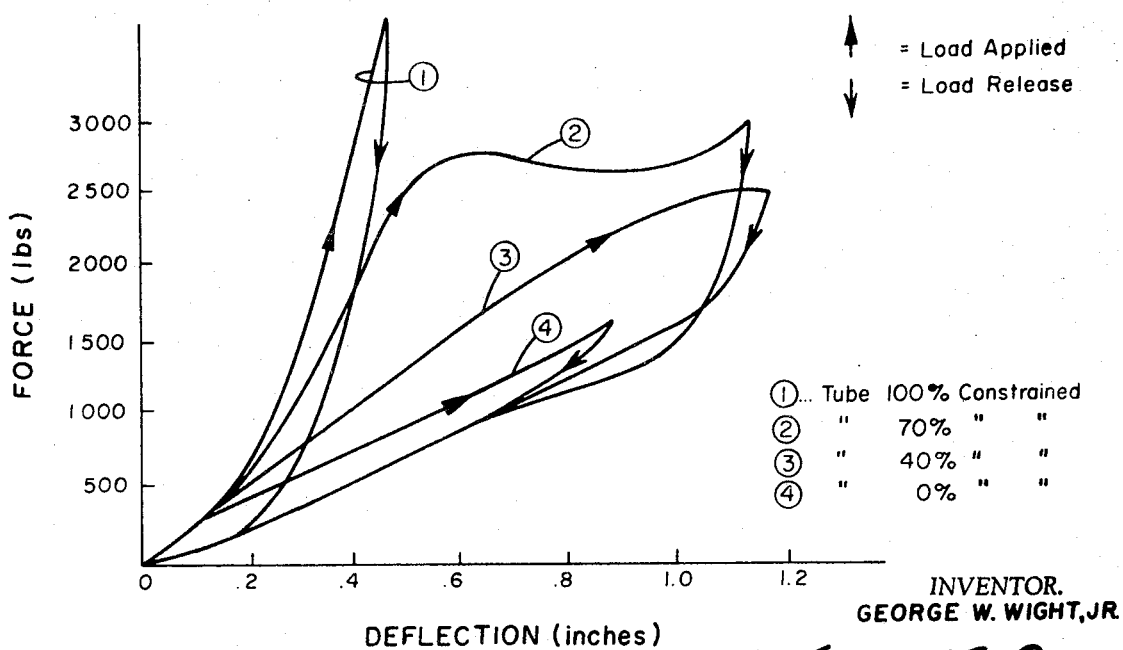
FIG. 8 is a force/deflection diagram showing comparative performance characteristics of the invention and of prior art devices.

Referring now specifically to the chart shown in FIG. 8, it will be appreciated that in a conventional device in which the elastomeric member is completely constrained on the outside periphery, see Curve 1, the resistance or reaction to the load is undesirably high and occurs over a relatively short increment of stroke. The test results shown in FIG. 8 were obtained by applying a load at 5 inches per minute. The conventional device, such as a buckling column, as is, for instance, illustrated in U. S. Pat. No. 2,154,586, see Curve 4, generates a relatively low reaction although the energy absorbing capability within predetermined force restraints does show improvement over that established in a device having 100 percent constraint. As already noted, the optimum condition for constraint probably resides in the range of 40-80 percent, although, due to the numerous conditions which must be taken into consideration, it is difficult, at least at this time, to establish any optimum range. However, it will be obvious to those skilled in the art that the almost square wave pattern established by restraining 70 percent of an elastomeric member provides an energy absorption curve which is most efficient for the particular deployment in automotive vehicles.

Figure 3:
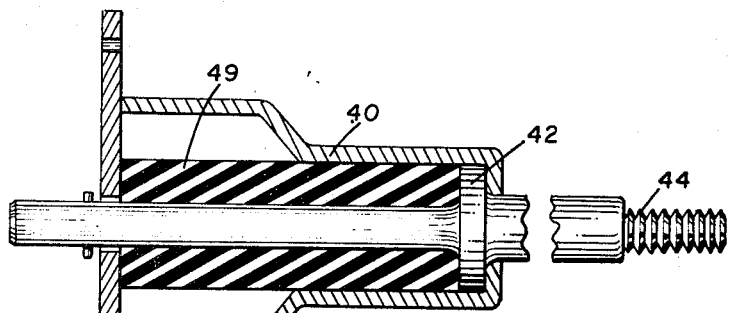
Figure 2:
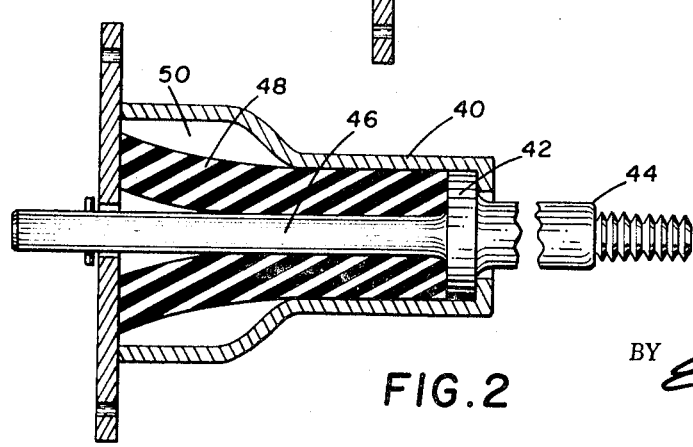

The modifications of the device shown in FIGS. 2 and 3 follow, generally, the concept delineated above although the structural modifications thereof may, or do, have an altering effect upon the performance characteristics of the devices. More particularly, the tubular casing 40 is bell-shaped to receive therein a flanged piston head 42 having an outwardly projecting piston rod 44 including a threaded portion and an inwardly projecting rod 46. The elastomeric member 48, shown in FIG. 2, is flared in the enlarged region 50 whereas elastomeric member 49, shown in FIG. 3, is identical to member 30 shown in FIG. 1.

Figure 4:
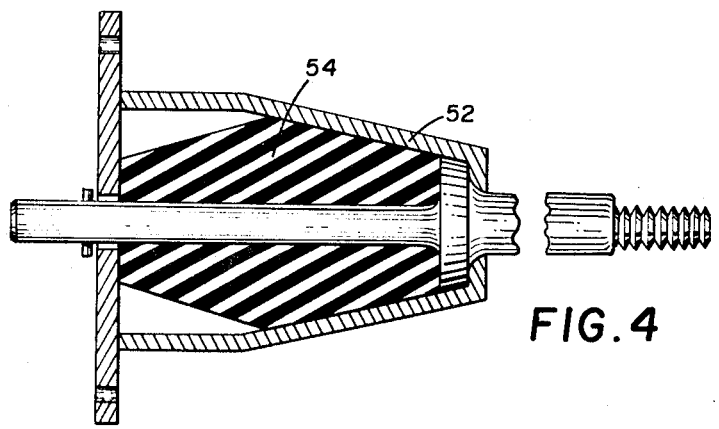

FIG. 4 differs from FIGS. 2 and 3 in that the casing 52 in the forward section thereof has an increasing diameter in a direction towards the center of the device whereby additional friction is induced between the elastomeric member 54 and the adjacent wall portions of the casing 52.

Figure 5:
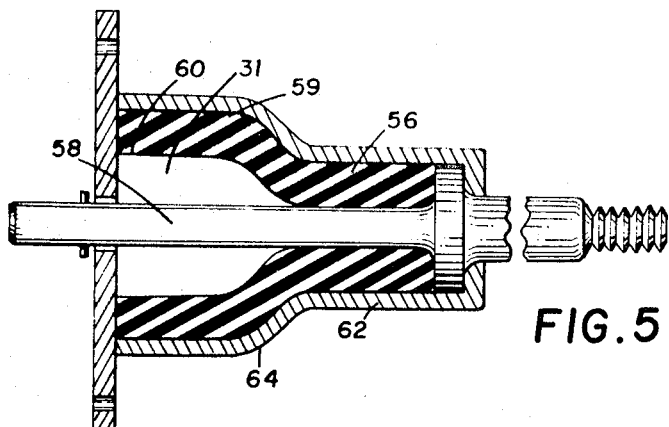
FIGS. 2 to 6 are views similar to FIG. 1 showing various modifications of the invention.

FIG. 5 shows a device similar to FIG. 3 except that the elastomeric member 56 is bell-shaped establishing the clearance area 31 for expansion or deflection of the elastomeric material between the piston rod 58 and the enlarged inside face 60 of the elastomeric member 56. Additionally, the outer diameter of the enlarged portion 59 of the elastomeric member 56 is adhesively bonded to the casing 62 in the area up to and including the bell-shaped portion 64 of the casing 62.

Figure 6:
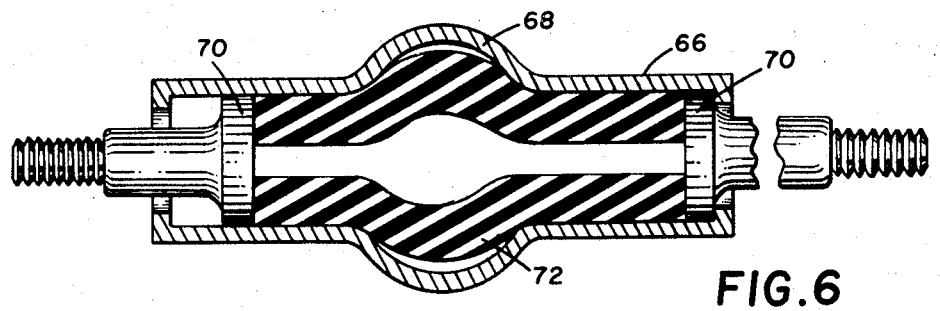

In FIG. 6 there is shown a casing 66 in which the radially enlarged portion, see 68, of the casing 66 is intermediate to the axial ends. A piston head 70 is disposed at each axial end; the configuration of the piston heads being similar to those shown and described with respect to FIGS. 2 to 5 except for the elimination of the inside piston rod. The double-action shock absorber, as shown, utilizes a tubular elastomeric member 72 which, under axial load, deflects and bulges in the enlarged area 68 as shown in FIG. 6. It should be noted that the modifications discussed herein above may all be constructed with or without an inwardly extending piston rod, although the the use of a piston rod is preferred.

Figure 7:
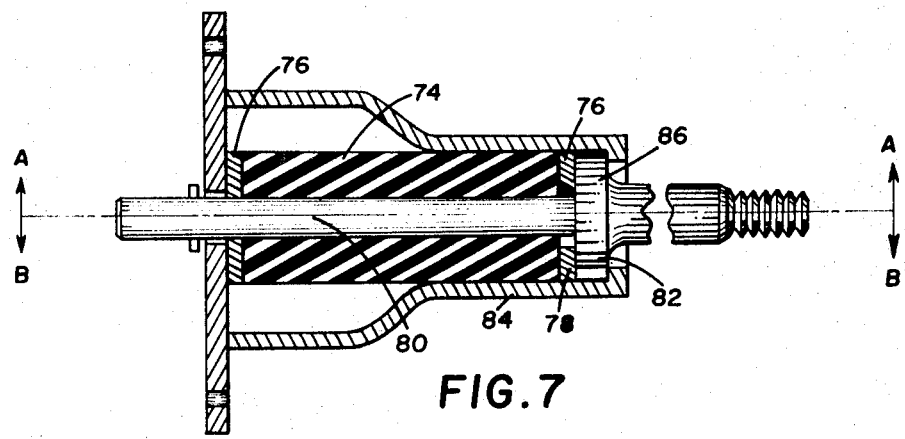
FIG. 7 is a view similar to FIG. 1 showing two modifications thereof, one sectional view is taken along line A—A and the other view is taken along line B—B to illustrate two variations which may be incorporated into the device.

Finally, FIG. 7 discloses two embodiments which are symmetrically identical, except as noted, and the device as a whole is similar to the device shown in FIG. 3. At the rearward axial end of the elastomeric member 74 there is bonded thereto a metal washer 76 which has an inside and outside diameter substantially the same as the elastomeric member 74. The washer 76 places an additional constraint upon the elastomeric member 74 so that the same will deflect and bulge in a predetermined manner. In this modification illustrated by Section A—A, another washer 76 is placed upon the opposite axial end of the elastomeric member 74. However, in the further modification shown by Section B—B, there is provided a washer 78 having an inside diameter substantially smaller than the outside diameter of piston rod 80 to permit conical movement therebetween. For the same purpose, the piston head 82 (in Section B—B only) has an outside diameter which is significantly smaller than the inside diameter of the casing 84. In the modification shown in section taken along line A—A, the piston head 86 has a full diameter which is in slidable engagement with the casing 84.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Elastomeric spring and frictional damping shock absorber, comprising:

a rigid casing of generally tubular configuration having an enlarged region of comparatively greater diameter than the forward region of the tubular casing, said casing having structurally restricted axial ends;

an axially movable rigid piston member in the forward region of said casing;

a substantially tubular elastomeric member disposed in said casing axially between said piston member and a restricted end, said elastomeric member having a substantially uniform outer diameter in the forward region which dimensionally equals or exceeds the inside diameter of said forward region to place said elastomeric member under radial constraint;

the enlarged region of said casing having an inside diameter effective to permit limited deflection and bulging of said elastomeric member; and said piston member comprising a piston head abutting the axial end of the tubular elastomeric member, and a piston rod extending from said head into the opening of the tubular member for movement relative to the latter.

2. Elastomeric shock absorber according to claim 1, wherein said piston head is formed as a truncated cone.

3. Elastomeric shock absorber according to claim 1, wherein most of the outer surface of said rod is in frictional contact with the inner surface of said tubular member.

4. Elastomeric shock absorber according to claim 1, and a rigid washer bonded to each axial end of the tubular member.

5. Elastomeric shock absorber according to claim 4, wherein at least one of said washers has an inside diameter significantly greater than the adjacent outer diameter of the rod to permit conical movement of said rod.

6. Elastomeric shock absorber according to claim 5, wherein said piston head has an outer diameter greater than the said inside diameter of the last mentioned washer, but significantly smaller than the inside diameter of the casing effective to permit conical movement of said piston head.

7. Elastomeric shock absorber according to claim 1, wherein portions of the outer surface of said elastomeric member are bonded to the inside surface of the casing.

8. Elastomeric shock absorber according to claim 1, wherein said enlarged region is bell-shaped and located at one axial end of the casing.

9. Elastomeric shock absorber according to claim 1, wherein said enlarged region is bell-shaped and located intermediate the axial ends of said casing.

10. Elastomeric shock absorber according to claim 9, wherein said piston member is disposed adjacent to and bears upon each axial end of said elastomeric member.

11. Elastomeric shock absorber according to claim 1, wherein essentially the total clearance volume in the casing available for expansion of the elastomeric member is filled by the latter upon actuation and completion of the total stroke of said piston.

12. Elastomeric shock absorber according to claim 1, wherein said piston rod extending from said head is adapted for movement through the opening of the tubular elastomeric member and through one of said end covers.

* * * * *

PO-1050
(5/69)

UNITED STATES PATENT OFFICE
CERTIFICATE OF CORRECTION

Patent No. 3,752,462              Dated August 14, 1973

Inventor(s) George W. Wight, Jr.

It is certified that error appears in the above-identified patent and that said Letters Patent are hereby corrected as shown below:

Title Page

Item /73/   Delete "Clevite Corporation" and substitute therefor --Gould Inc.--

Signed and sealed this 27th day of November 1973.

(SEAL)
Attest:

DWARD M. FLETCHER JR.                RENE D. TEGTMEYER
Attesting Officer                    Acting Commissioner of Patents